US012763508B2

(12) United States Patent
Szu et al.

(10) Patent No.: US 12,763,508 B2
(45) Date of Patent: Oct. 13, 2026

(54) ELECTRICAL CONNECTOR WITH IMPROVED GROUNDING TERMINALS

(71) Applicants: FUDING PRECISION COMPONENTS (SHENZHEN) CO., LTD., Shenzhen (CN); FOXCONN INTERCONNECT TECHNOLOGY LIMITED, Grand Cayman (KY)

(72) Inventors: Ming-Lun Szu, New Taipei (TW); Tsung-Lin Tsai, New Taipei (TW)

(73) Assignees: FUDING PRECISION COMPONENTS (SHENZHEN) CO., LTD., Shenzhen (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 325 days.

(21) Appl. No.: 18/501,411

(22) Filed: Nov. 3, 2023

(65) Prior Publication Data

US 2024/0154340 A1 May 9, 2024

Related U.S. Application Data

(63) Continuation-in-part of application No. 18/372,378, filed on Sep. 25, 2023.

(30) Foreign Application Priority Data

Nov. 3, 2022 (CN) ......................... 202211370506.2
Nov. 3, 2022 (CN) ......................... 202222925502.8

(51) Int. Cl.
*H01R 13/24* (2006.01)
*H01R 12/70* (2011.01)
*H01R 12/71* (2011.01)

(52) U.S. Cl.
CPC ....... *H01R 13/245* (2013.01); *H01R 12/7076* (2013.01); *H01R 12/716* (2013.01)

(58) Field of Classification Search
CPC .............. H01R 12/7076; H01R 12/716; H01R 13/2435; H01R 13/245; H01R 13/6471; H01R 13/6585
See application file for complete search history.

(56) References Cited

U.S. PATENT DOCUMENTS 4,906,194 A * 3/1990 Grabbe ................ H01R 12/714 439/71
4,927,369 A * 5/1990 Grabbe ................ H01R 12/714 439/82

(Continued)

FOREIGN PATENT DOCUMENTS

CN 107946805 A 4/2018
TW M426159 U 4/2012

*Primary Examiner* — Abdullah A Riyami
*Assistant Examiner* — Thang H Nguyen
(74) *Attorney, Agent, or Firm* — Ming Chieh Chang

(57) ABSTRACT

An electrical connector includes: an insulating housing; plural rows of signal terminals; and a respective row of grounding terminals disposed in the insulating housing, each of the grounding terminals comprising a main part retained in the insulating housing and an upper elastic arm and a lower elastic arm extending obliquely from the main part, each of the upper and lower elastic arms having a respective contacting portion and a respective end extending downward from the contacting portion, wherein the main part defines a front face and a rear face confronting adjacent signal terminals, an upper face, and a lower face; and the respective ends deviate from the main part toward the rear face or the front face of the main part for contacting with the rear face or the front face of the main part.

10 Claims, 15 Drawing Sheets

(56) References Cited

U.S. PATENT DOCUMENTS

| | | | | |
|---|---|---|---|---|
| 5,230,632 | A * | 7/1993 | Baumberger | H01R 13/03 439/74 |
| 5,484,295 | A * | 1/1996 | Mowry | H01R 12/52 439/65 |
| 5,653,598 | A * | 8/1997 | Grabbe | H05K 7/1069 439/74 |
| 6,994,565 | B2 | 2/2006 | Harper et al. | |
| 7,052,284 | B2 * | 5/2006 | Liao | H01R 13/2435 439/862 |
| 7,160,115 | B2 * | 1/2007 | Huang | H01R 13/2435 439/66 |
| 7,186,119 | B2 * | 3/2007 | Perugini | H01R 13/2435 439/862 |
| 7,785,112 | B2 * | 8/2010 | Hashimoto | H01R 12/7076 439/66 |
| 9,425,525 | B2 * | 8/2016 | Walden | H01R 12/7082 |
| 10,199,756 | B2 * | 2/2019 | Ju | H01R 13/2464 |
| 10,833,441 | B2 * | 11/2020 | Hsu | H01R 13/428 |
| 2013/0323970 | A1 * | 12/2013 | Wang | H01R 13/658 439/607.08 |
| 2020/0169019 | A1 * | 5/2020 | Cheng | H01R 12/724 |
| 2021/0305754 | A1 * | 9/2021 | Ho | H01R 12/7082 |

* cited by examiner

ELECTRICAL CONNECTOR WITH IMPROVED GROUNDING TERMINALS

CROSS REFERENCE TO RELATED APPLICATIONS

This application is a continuation-in-part of U.S. patent application Ser. No. 18/372,378, filed on Sep. 25, 2023, the content of which is incorporated entirely herein by reference.

BACKGROUND OF THE INVENTION

Field of the Invention

The present invention relates to an electrical connector for connecting an electronic package.

Description of Related Arts

U.S. Pat. No. 4,927,369 discloses a connector for connecting a chip to a mother board, including an insulating housing and a plurality of terminals disposed in the insulating housing. Each terminal includes a upright main part with a contacting face, an upper elastic arm with an upper end, and a lower elastic arm with a lower end, the upper end of the upper elastic arm and the lower end of the lower elastic arm contacting with the contacting face when the upper elastic arm and the lower elastic arm are pressed. Since the size of the contacting face of the main part is affected by the thickness of the terminal which is limited, the contacting face of the main part is very small. The upper end of the upper elastic arm and the lower end of the lower elastic arm would have a poor contact with the contacting face of the main part if the terminal is not correctly installed.

Therefore, it is desired to provide an electrical connector with improved grounding terminals.

SUMMARY OF THE INVENTION

An object of the present invention is to provide an electrical connector with improved grounding terminals. To achieve the above object, an electrical connector comprises: an insulating housing; a plurality of rows of signal terminals disposed in the insulating housing; and a respective row of grounding terminals disposed in the insulating housing and located between every two adjacent rows of signal terminals, each of the grounding terminals comprising a main part retained in the insulating housing and an upper elastic arm and a lower elastic arm extending obliquely from the main part, the upper elastic arm having an upper contacting portion and an upper end extending downward from the upper contacting portion, the lower elastic arm having a lower contacting portion and a lower end extending upward from the lower contacting portion; wherein the main part defines a front face and a rear face confronting with adjacent signal terminals, an upper face, and a lower face; and the upper end and the lower end deviate from the main part toward the rear face or the front face of the main part for contacting with the rear face or the front face of the main part when the upper and lower elastic arms move to the main part.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
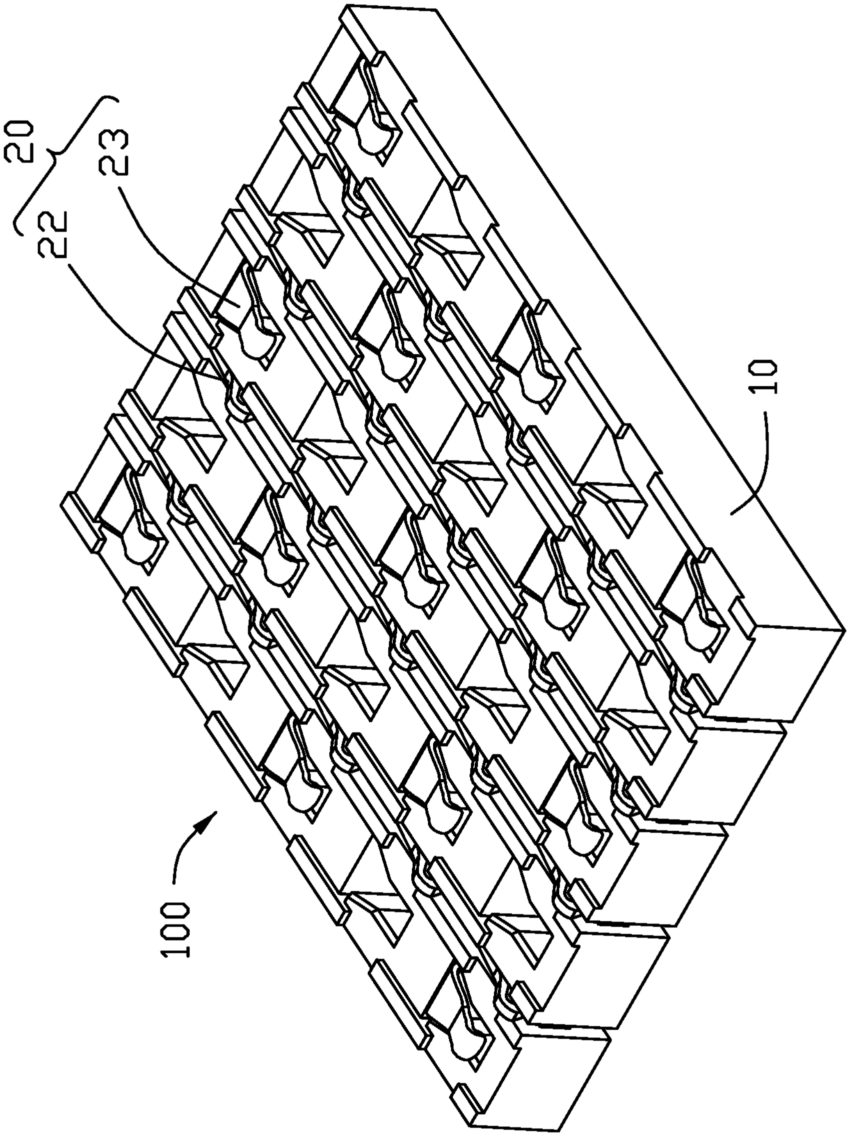
FIG. 1 is a perspective view of an electrical connector according to a first embodiment of this present invention.
Figure 2:
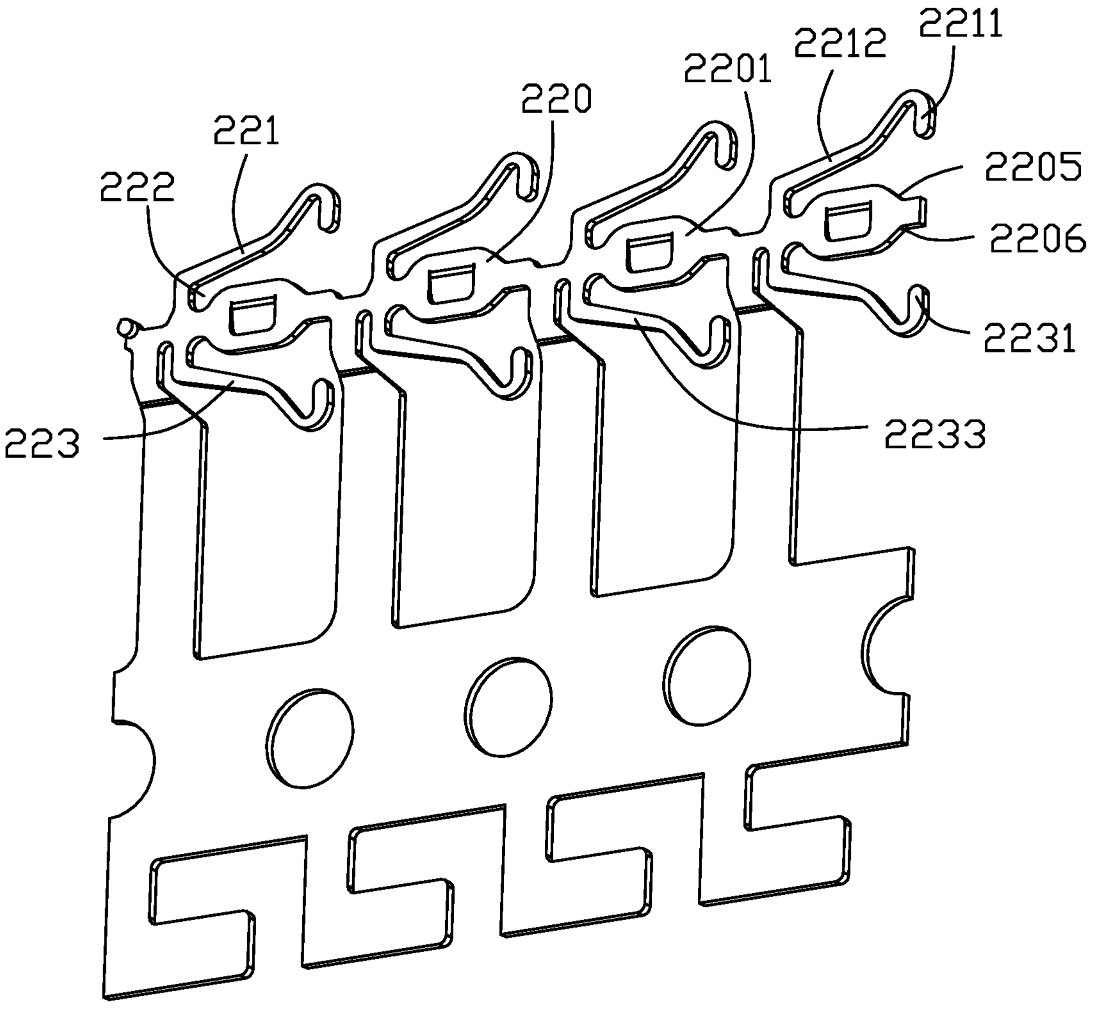
FIG. 2 is a perspective view of a row of grounding terminals in FIG. 1, wherein the grounding terminals are connected to a strip.
Figure 3:
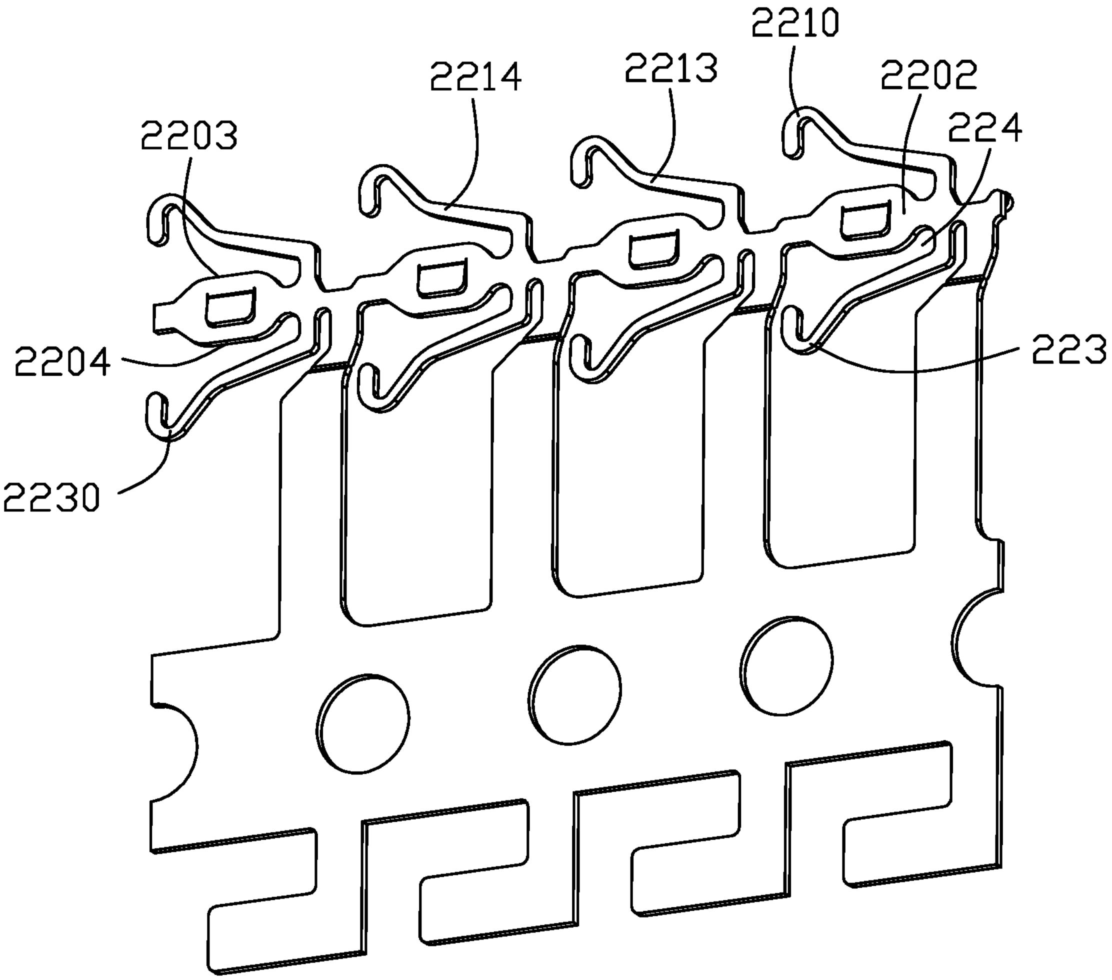
FIG. 3 is another perspective view of the grounding terminals of FIG. 2.

Referring to FIGS. 1-3 showing an electrical connector 100 for connecting an electronic package to a main board, the electrical connector 100 includes an insulating housing 10 and a plurality terminals 20 which include a plurality of first/gournding/shielding terminals 22 and a plurality of second/signal terminals 23 received in the insulating housing 10. The signal terminals 23 are arranged in a matrix and a row of the grounding terminals 22 is arranged as a whole and located on one side of each row of the signal terminals 23, that is, every two rows of the signal terminals 23 are shielded with one row of grounding terminals 11. Each row of grounding terminals 22 are made from a metal plate as shown in FIG. 2.

Each of the grounding terminals 22 includes a main part 220 extending upright and transversely, an upper elastic arm 221 and a lower elastic arm 224. The main part 220 is located at one side of the signal terminals 22 to get a shielding performance, and the elastic arms are adapted for contacting with PCB, chip and so on. The upper elastic arm 221 defines an upper contacting portion 2210 protruding upward and an upper end 2211 extending downwardly from the upper contacting portion 2210. Preferably, in this embodiment, the main part 220 defines a first notch 222 through opposite sides of the main part 220 at a junction of the upper elastic arm 221 for increasing the elasticity of the upper elastic arm 221. The lower elastic arm 224 defines a lower contacting portion 2230 protruding downward and a lower end 2231 extending upwardly from the lower contacting portion 2230, the main part 220 also defines a second notch 224 through opposite sides of the main part 220 at a junction of the lower elastic arm 223.

Referring to FIGS. 2-3, in this embodiment, the main part 220 defines a vertical front face 2201 and a vertical rear face 2202 and an upper face and a lower face connecting the front face 2201 and the rear face 2202 respectively at two ends of the main part 220 in an upper-lower direction as the main part 220 extending upright and transversely. Both an area of the front face and the rear face are larger than that of the upper face 2203 or the lower face 2204. The front and rear faces confront with the signal terminals 23 to shield. The upper elastic arm 221 extends upward and transversely from the upper face 2203. The first notch 222 is located lower than the upper face 2203 of the main part 220 and goes through the front face 2201, the rear face 2202 and the upper face 2203. The upper elastic arm 221 defines a front face 2212 and a rear face 2213. Similar to the upper elastic arm 221, the lower elastic arm 223 extends downward and transversely from the lower face 2204 and defines a front face 2233 and a rear face (not labeled). In this embodiment, the first terminal 22 is blanked from a metal plate with a first side face (not labeled) and a second side face (not labeled) in a plate shape, the front face 2212 of the upper elastic arm 221, the front face 2233 of the lower elastic arm 224 and the front face 2201 of the main part 220 are made from the first side face of the metal plate, and the rear face 2213 of the upper elastic arm 221, the rear face 2213 of the lower elastic arm and the rear face 2202 of the main part 220 are made from the second side face of the metal plate. The upper elastic arm 221 and the lower elastic arm 224 are in the same plane with the main part 220, that is, the upper elastic arm 221 and the lower elastic arm 224 are in the same plate that constituted by the first side face and the second side face of the metal plate. The main part 220 defines a first groove 2205 recessed from the upper face 2203 of the main part 220 and a second groove 2206 recessed from the lower face 2204 of the main part 220, the upper end 2211 goes into the first groove and the lower end 2231 goes into the second groove 2206 when the upper elastic arm 221 and the lower elastic arm are pressed towards the main part 220 respectively.

In the first embodiment, the upper end 2211 goes into the first groove and the lower end 2231 goes into the second groove 2206 when the upper elastic arm 221 and the lower elastic arm 223 are pressed respectively. However, the contact area between the elastic arm and the main part 220 is small, in order to overcome this defect, the present invention also provides another form of terminals which is roughly the same as that of the first embodiment. The differences are mainly introduced below and the same component symbols are used for the same structure and will not be described in detail.

Figure 4:
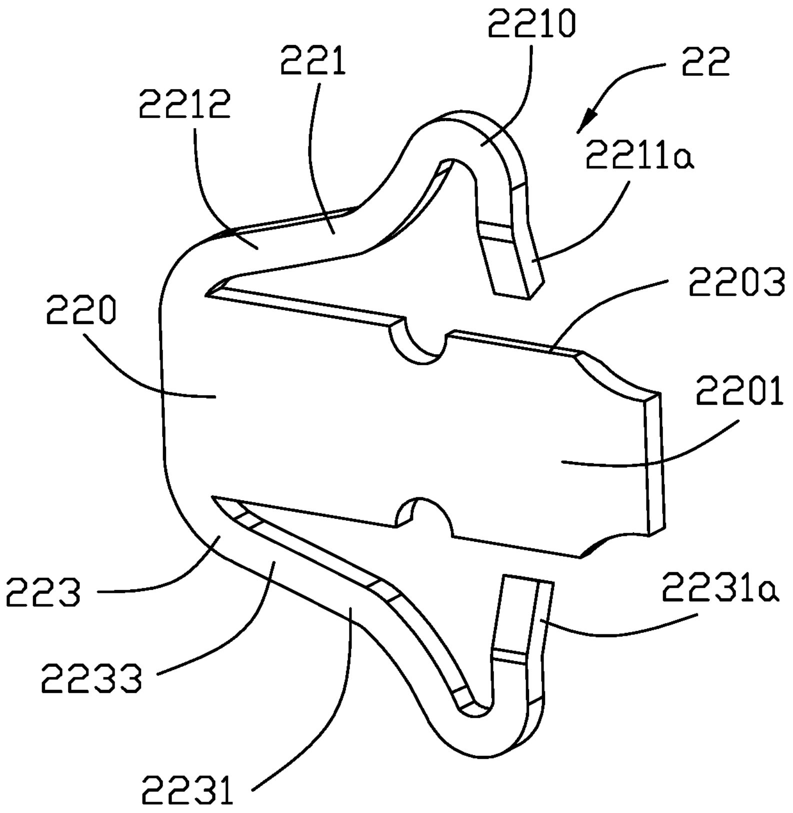
FIG. 4 is a perspective view of the grounding terminal of a second embodiment of this present invention.
Figure 5:
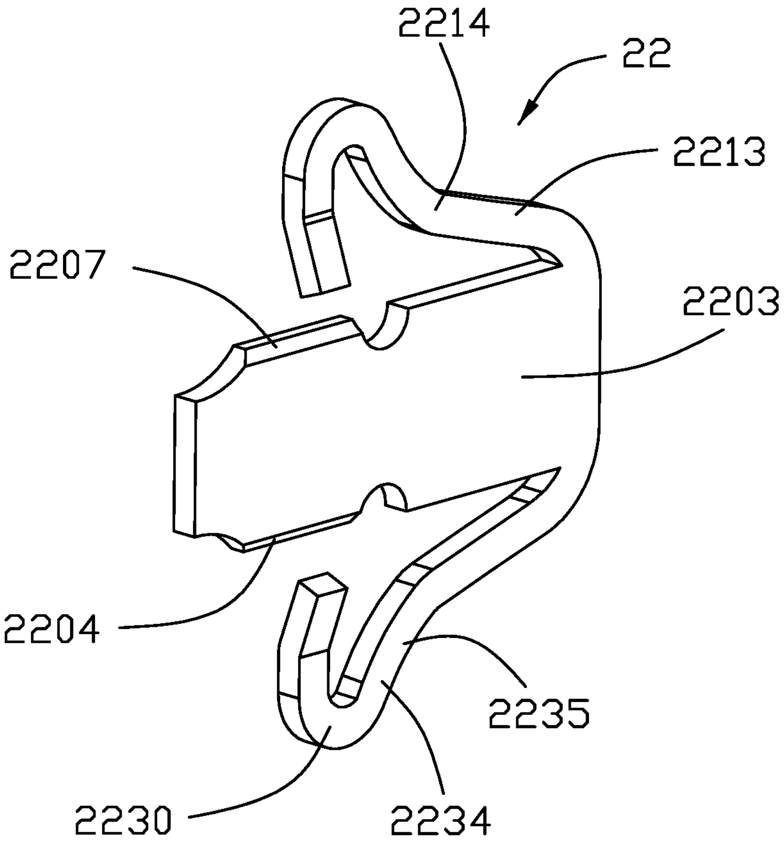
FIG. 5 is another perspective view of the grounding terminals of FIG. 4.
Figure 6:
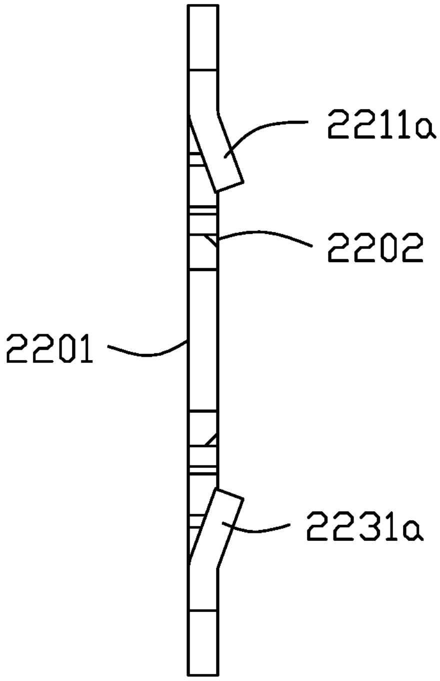
FIG. 6 is a side view of the grounding terminals of FIG. 4.

Referring to FIGS. 4-6 showing another grounding terminals 22 in a second embodiment which is similar to the first embodiment, in this embodiment, each of the grounding terminals 22 includes the main part 220, upper elastic arm 221 and lower elastic arm 223. The upper elastic arm 221 includes the upper contacting portion 2210, the upper end 2211*a* extending downwardly from the upper contacting portion 2210 and an upper inclined part 2214 between the main part 220 and the upper contacting portion 2210. Both the front face 2201 and the rear face 2202 are of a vertical face, the upper elastic arm 221 extends upward and transversely from the upper face 2203. The lower elastic arm 223 extends downward and transversely from the lower face 2204 and includes a lower contacting portion 2230, the lower end 2231*a* extending upwardly from the lower contacting portion 2230 and a lower inclined part 2235 between the main part 220 and the lower contacting portion 2230. The first terminal is made from a metal plate with a vertical first face and a vertical second face opposite to the first face, the front face 2212 of the upper elastic arm, the front face 2233 of the lower elastic arm 233 and the front face 2201 of the main part 220 are located in the first face of the metal plate. The rear face 2213 of the upper elastic arm 221, the rear face 2234 of the lower elastic arm 223 and the rear face 2202 of the main part 220 are located in the second face of the metal plate.

The upper end 2211*a* deviates from the main part 220 in a front-rear direction perpendicular to the front and rear faces 2201, 2202 and is located adjacent to the rear face 2202, the upper end 2211*a* is guided to the rear face 2202 and sidewardly press against the main part 220 when the upper elastic arm 221 moves downward. Similar to the upper elastic arm 221, the lower end 2231*a* of the lower elastic arm 233 deviates from the main part 220 in the front-rear direction and is located adjacent to the rear face 2202, the lower end 2231*a* is guided to the rear face 2202 and sidewardly abuts the main part 220 when the lower elastic arm 223 is depressed and moves upwardly. It should be noted that, in the present invention, the description of the directions “front, or front face or front side face”, and “rear or rear face or rear side face” has no special limiting meaning. It is only defined to facilitate the description of the structure of the present application and should not be understood as limitations on this application. The upper and lower inclined part 2214, 2233, and the upper and lower contacting portion 2210, 2230 and the main part 220 are in the same plate. The upper end 2211*a* and the lower end 2231*a* are not in the same plate with the main part 220 as they deviate from the main part 220 in the front-rear direction. The upper end 2211*a* extends downward and rearward from the upper contacting portion 2210, and can press against the rear face 2202 of the main part 220 under a guiding face 2207 of the rear face 2202 when the upper contacting portion is pressed. The lower end 2231*a* extends upward and rearward from the lower contacting portion 2230, and can abut against the rear face 2202 of the main part 220 under another guiding face 2204 of the rear face 2202 when the lower contacting portion is pressed. In this embodiment, the main part 220 alternatively defines the first notch and second notch for increasing the elasticity of the upper elastic arm 221 and the lower elastic arm 223. Alternatively, one of the upper end 2211*a* and the lower end 2231 deviates from the main part 220 in the front-rear direction and adjacent to the front face 2201, while the other deviates from the main part 220 in the front-rear direction and adjacent to the rear face 2202. As shown in FIG. 6, the upper and lower ends 2211*a*, 2231*a* slant linearly from the contacting portions.

Figure 7:
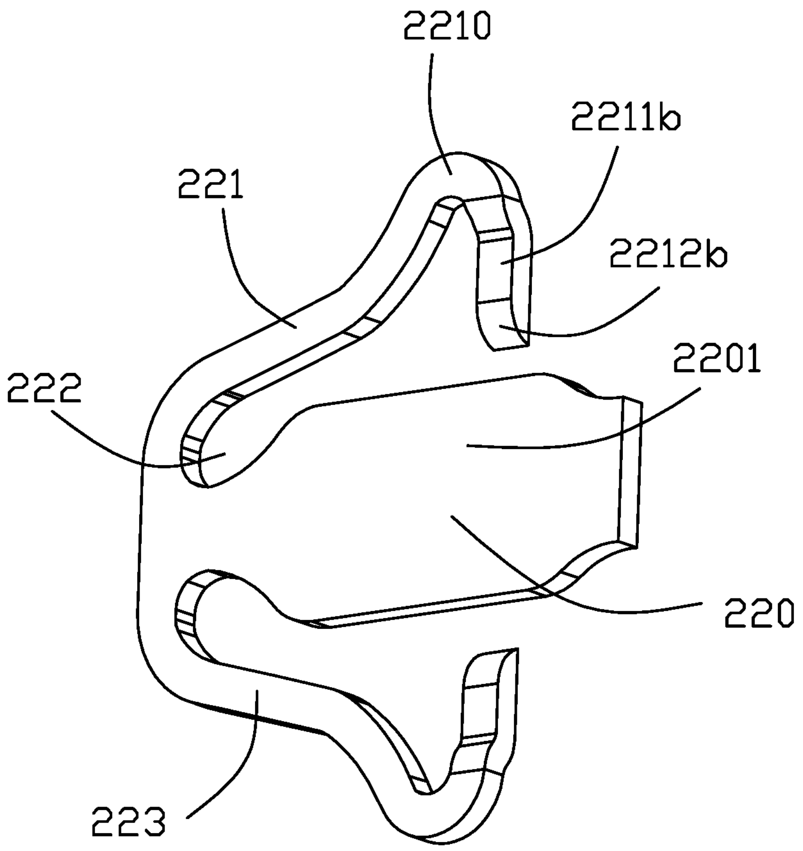
FIG. 7 is a perspective view of the grounding terminal in a third embodiment of this present invention.
Figure 8:
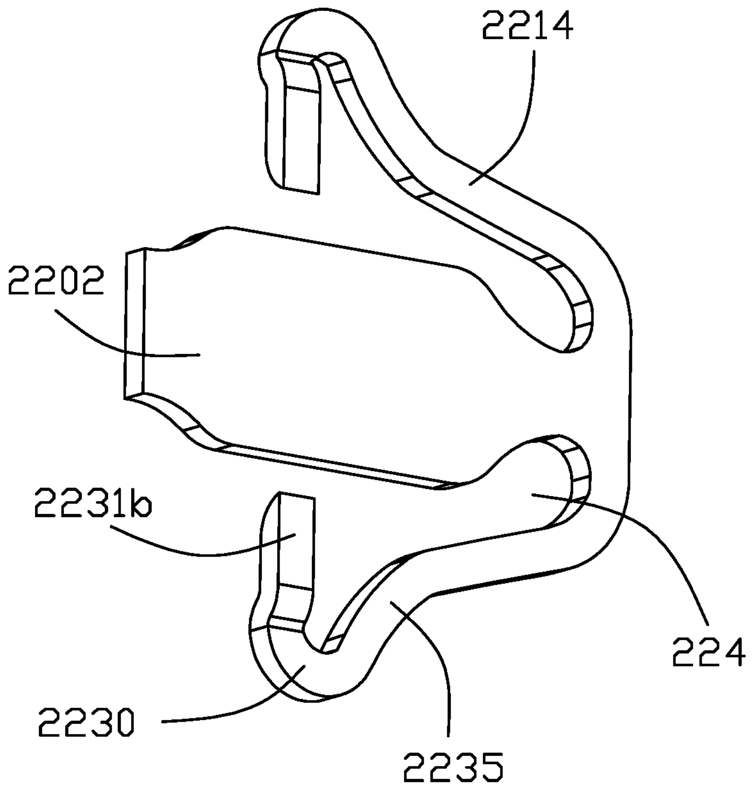
FIG. 8 is another perspective view of the grounding terminal of FIG. 7.
Figure 9:
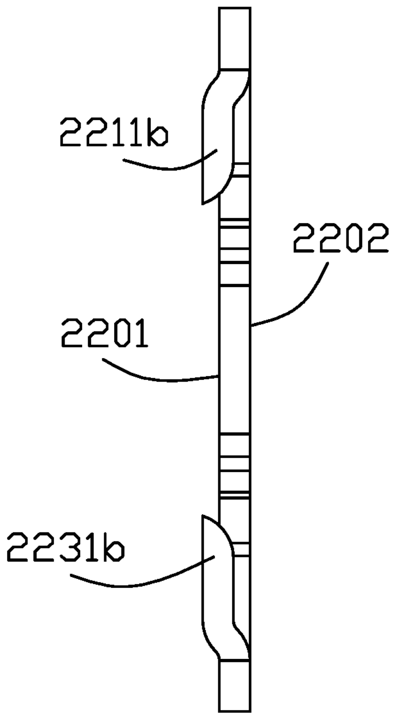
FIG. 9 is a side view of the grounding terminal of FIG. 7.

Referring to FIGS. 7-9 showing grounding terminals 22 in a third embodiment which is similar to the first terminals 22 in the second embodiment, each of the grounding terminals 22 includes the main part 220, upper elastic arm 221 and the lower elastic arm 223. The upper elastic arm 221 includes the upper contacting portion 2210, the upper end 2211*b* extending from the upper contacting portion 2210 and the upper inclined part 2214 between the upper end 2211*b* and the upper contacting portion 2210. The lower elastic arm 223 includes the lower contacting portion 2230, the lower end 2231*b* and the lower inclined part 2235. The front face 2201 and the rear face 2202 are of a vertical face, the upper and lower inclined part 2214, 2235, the upper and lower contacting portion 2210, 2230 and the main part are in the same plate. The upper and the lower end 2211*b*, 2231*b* are not in the same plate with the main part 220 as they deviate from the main part 220 in the front-rear direction. However, the way the upper and lower end 2211*b*, 2231*b* deviate from the main part 220 is different from that in the second embodiment. In this embodiment, the upper end 2211*b* bends rearward from the upper contact portion 2210 forming a bending portion (not labeled) and then extends vertically downward forming a vertical portion (not labeled). Referring to FIG. 9 showing a side view of the grounding terminal 22, the vertical portion of the upper end 2211*b* partially overlaps the main part 220 in the front-rear direction. Therefore, the vertical portion of the upper end 2211*b* is not completely behind the rear face 2202. So the upper end 2211*b* can tightly contact with the rear face 2202 when the upper elastic arm 221 is pressed. The upper end 2211*b* can smoothly go and contact with the rear face 2202 under the guidance of the guiding face 2212*b* of the upper end 2211*b*. The main part 220 also defines the first notch 222 and a second notch 224 through opposite sides of the main part 220 to increase the elasticity of the upper elastic arm 221 and the lower elastic arm 223. Alternatively, one of the upper end 2211*a* of the upper elastic arm 221 and the lower end 2231 of the lower elastic arm 233 deviates to be adjacent to the front face 2201 while the other deviates to be adjacent to the rear face 2202.

Figure 10:
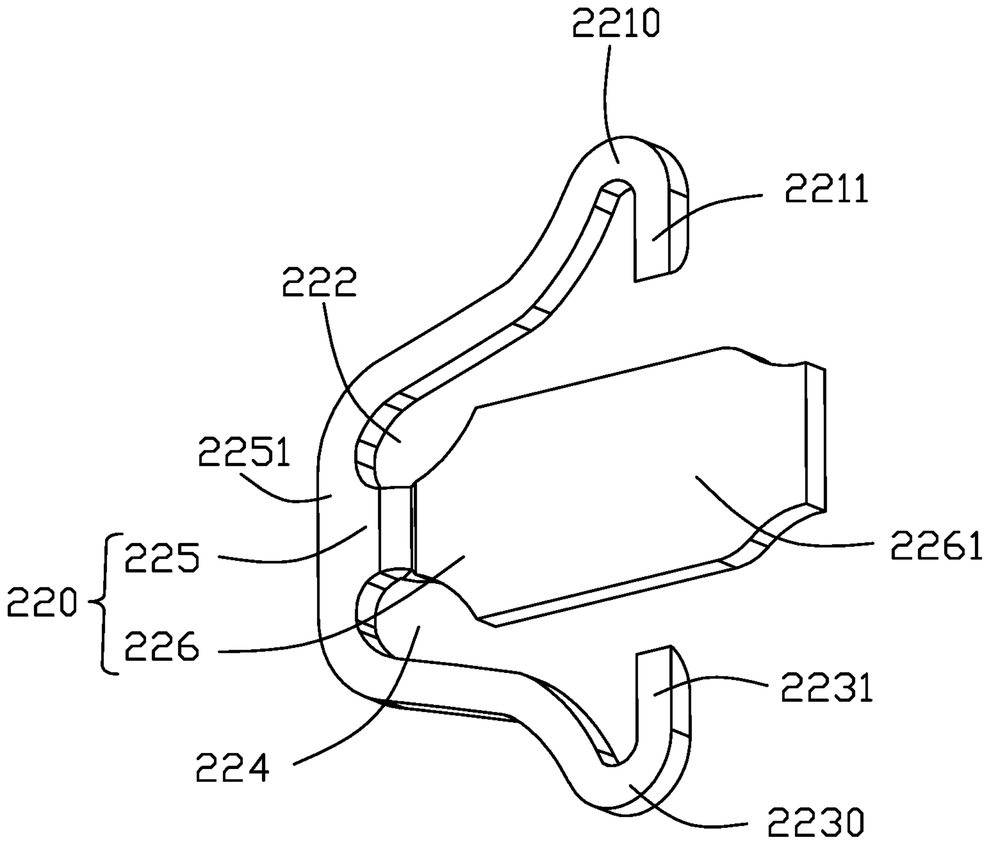
FIG. 10 is a perspective view of the grounding terminal in a fourth embodiment of this present invention.
Figure 11:
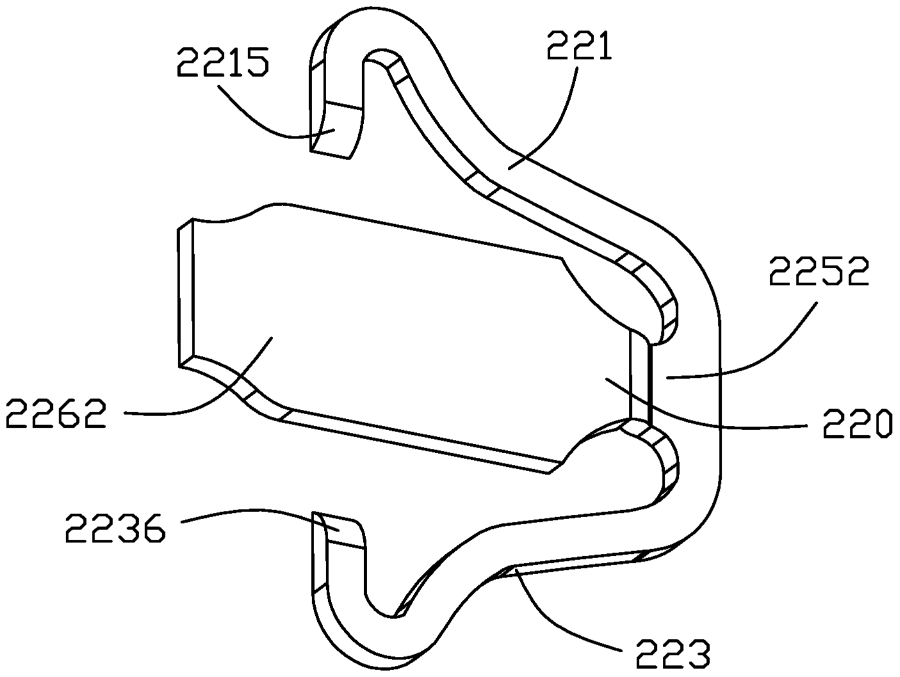
FIG. 11 is another perspective view of the grounding terminal in FIG. 10.
Figure 12:
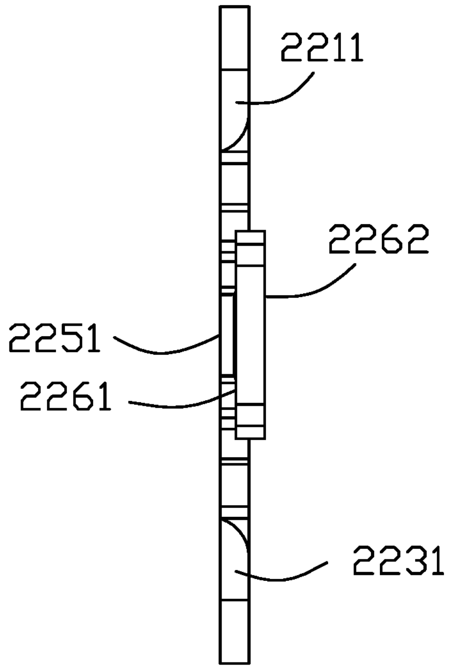
FIG. 12 is a side view of the grounding terminal of FIG. 10.

Referring to FIGS. 10-12 showing another grounding terminals 22 in a fourth embodiment which is similar to the terminals 22 in the first embodiment, the grounding terminal 22 includes the main part 220, the upper elastic arm 221 and the lower elastic arm 223. The upper elastic arm 221 includes the upper contacting portion 2210 and the upper end 2211 bending downward from the upper contacting portion 2210, the lower elastic arm 223 includes the lower contacting portion 2230 and the lower end 2231 bending upward from the lower contacting portion 2230. The main part defines the first notch 222 and a second notch 224 through opposite sides of the main part 220 to increase the elasticity of the upper elastic arm 221 and the lower elastic arm 223. Differing from the first embodiment, the main part 220 includes a first main part 225 and a second main part 226 arranged in sequence along the transverse direction. The second main part 226 is connected with the first main part 225 by a bending connection (not labeled) which bends from the first main part 225 rearwardly, the upper elastic arm 221, the lower elastic arm 223 are in the same plane with the first main part 225, that is, the upper elastic arm 221 and the lower elastic arm 223 are in the same plate formed by the front face 2251 and the rear face 2252 of the first main part 225, so the upper elastic arm 221 and the lower elastic arm 223 deviate from the second main part 226 in the front-rear direction and can get contact with the second main part 226 sidewardly when pressed. The bending connection is located between the first recess 222 and the second recess 224 in the upper-lower direction. In order to make the upper end 2211 and the lower end 2231 go and get contact with a front face 2261 of the second main part 226 smoothly, the upper end 2211 and the lower end 2231 are defined with arc shaped guiding faces 2215, 2216 respectively. The upper and lower elastic arm 221, 223 and the first main part 225 are overlapped with the second main part 226 view from a side view as shown in FIG. 12. Alternatively, the bending connection connecting the first main part 225 and the second main part 226 can bend in an opposite direction.

Figure 13:
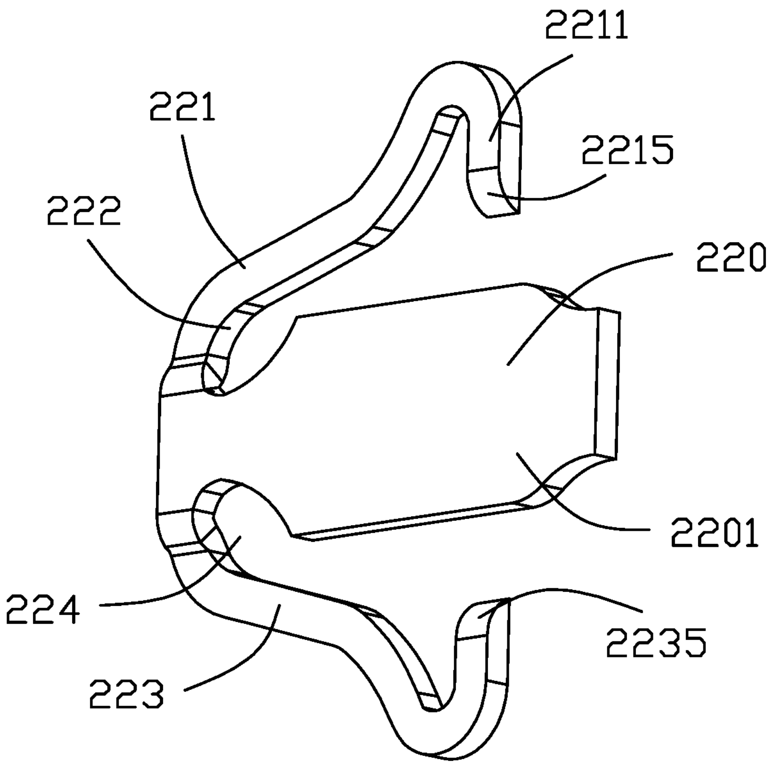
FIG. 13 is a perspective view of the grounding terminal in a fifth embodiment of this present invention.
Figure 14:
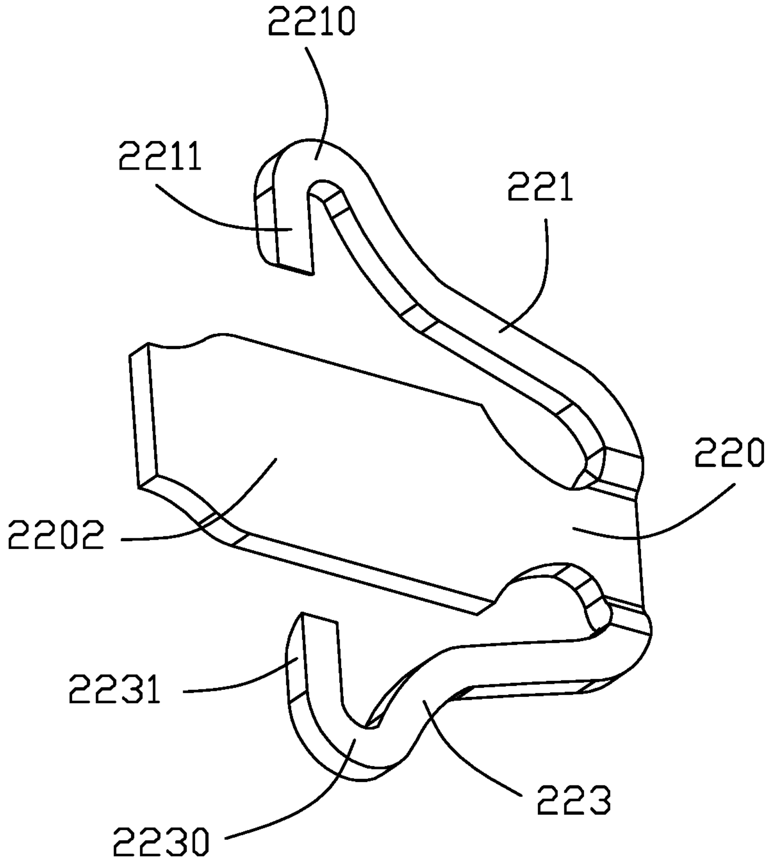
FIG. 14 is another perspective view of the grounding terminal in FIG. 13.
Figure 15:
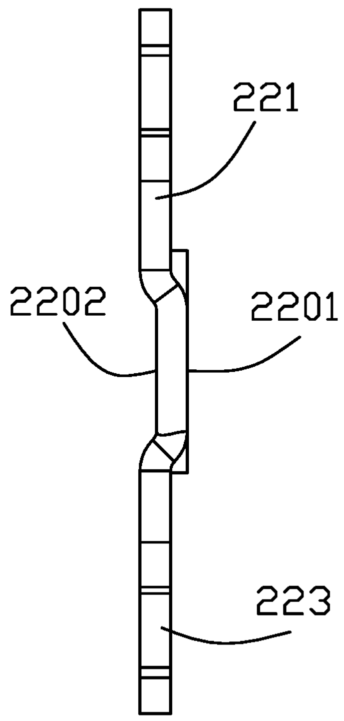
FIG. 15 is a side elevational view of the grounding terminal of FIG. 13.

Referring to FIGS. 13-15 showing another grounding terminals 22 in a fifth embodiment which is similar to the terminals 22 in the first embodiment, the grounding terminal 22 includes the main part 220, the upper elastic arm 221 and the lower elastic arm 223. The upper elastic arm 221 includes the upper contacting portion 2210 and the upper end 2211 bending downwardly from the upper contacting portion 2210, the lower elastic arm 223 includes the lower contacting portion 2230 and the lower end 2231 bending upwardly from the lower contacting portion 2230. The main part 220 defines first recess 222 and the second recess 224 for increasing the elasticity of the upper elastic arm 221 and the lower elastic arm 223, and the front face 2201 and the rear face 2202 of the main part 220 are of a vertical face. Differing from the terminals in the first embodiment, an end of the upper elastic arm 221 connecting with the main part 220 bends rearwardly first and then extends upward and transversely. An end of the lower elastic arm 223 connecting with the main part 220 bends rearwardly first and then extends vertically downward and transversely. In addition, the upper elastic arm 221 and the lower elastic arm 223 are overlapped with the main part 220 in the front-rear direction when the first terminal 220 is seen from the side view as shown in FIG. 15. Therefore, the upper end 2211 of the upper elastic arm 221 and the lower end 2231 of the lower elastic arm can get contact with the rear face 2202 of the main part 220 tightly when pressed. The free ends of the upper end 2211 and the lower end 2231 have the guiding faces 2215, 2216 respectively to make them go and get contact with rear face 2202 of the main part 220 smoothly.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. An electrical connector comprising:

an insulating housing;

a plurality of rows of signal terminals disposed in the insulating housing; and a respective row of grounding terminals disposed in the insulating housing and located between every two adjacent rows of signal terminals, each of the grounding terminals comprising a main part retained in the insulating housing and an upper elastic arm and a lower elastic arm extending obliquely from the main part, the upper elastic arm having an upper contacting portion and an upper end extending downward from the upper contacting portion, the lower elastic arm having a lower contacting portion and a lower end extending upward from the lower contacting portion; wherein the main part defines a front face and a rear face confronting with adjacent signal terminals, an upper face, and a lower face;

the upper end and the lower end deviate from the main part toward the rear face or the front face of the main part for contacting with the rear face or the front face of the main part when the upper and lower elastic arms move to the main part; and each row of grounding terminals are connected together, and the upper and the lower elastic arms bend near an end of the grounding terminal and extend toward another end of the grounding terminal.

2. The electrical connector as claimed in claim 1, wherein the upper end and the lower end slant linearly, respectively.

3. The electrical connector as claimed in claim 1, wherein the upper end and the lower end bend rearwardly and then extend uprightly.

4. The electrical connector as claimed in claim 1, wherein the upper elastic arm and the lower elastic arm bend rearwards or forwards to deviate from the main part.

5. The electrical connector as claimed in claim 1, wherein the grounding terminals of the row is made from an upright metal plate.

6. The electrical connector as claimed in claim 1, wherein each of the upper end and the lower end includes a slanting guiding face.

7. The electrical connector as claimed in claim 1, wherein the main part defines a first notch and a second notch through the front face and the rear face, the first notch is located at a junction of the upper elastic arm and the main part, and the second notch is located at a junction of the lower elastic arm and the main part.

8. An electrical connector comprising:

an insulating housing; and a plurality of first terminals disposed in the insulating housing, each of the first terminal comprising a main part extending in an upright direction and a transverse direction and defining a front face and a rear face, and an upper elastic arm extending obliquely and upwardly from an upper face of the main part, the upper elastic arm defining an upper contacting portion and an upper end extending downwards from the upper contacting portion;

wherein the upper end deviates towards the rear face of the main part and contacts with the rear face of the main part after the upper elastic arm moves downwards; and wherein the first terminals are arranged in a row in the transverse direction and connected with each other by the main parts.

9. The electrical connector as claimed in claim 8, wherein the grounding terminal comprises a lower elastic arm with a lower contacting portion and a lower end extending from the lower contacting portion upwardly, and the lower end deviates towards the rear face of the main part and contacts with the rear face when the lower elastic arm moves upwards.

10. The electrical connector as claimed in claim 9, wherein the main part defines a first notch and a second notch through the front and the rear faces of the main part, the first notch is located at a junction of the upper elastic arm and the main part, and the second notch is located at a junction of the lower elastic arm and the main part.

* * * * *